(No Model.)
F. HOHORST.
SLING AND TRUCK COMBINED.
No. 379,870. Patented Mar. 20, 1888.
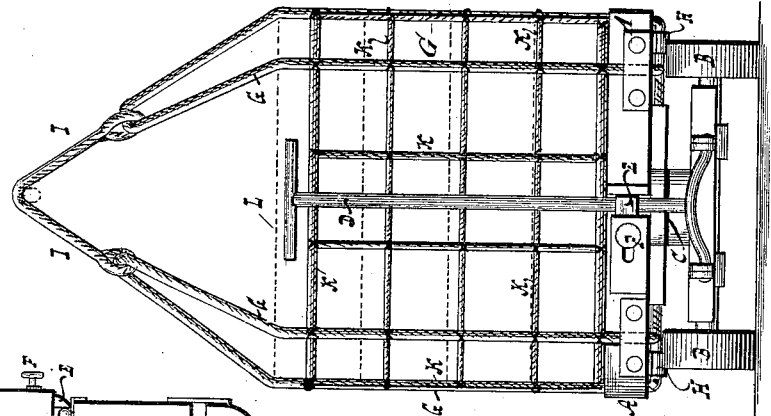
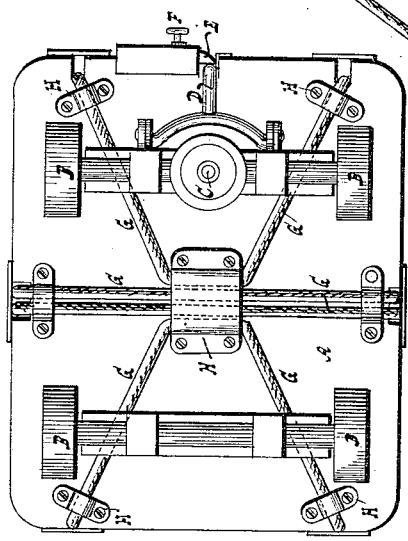
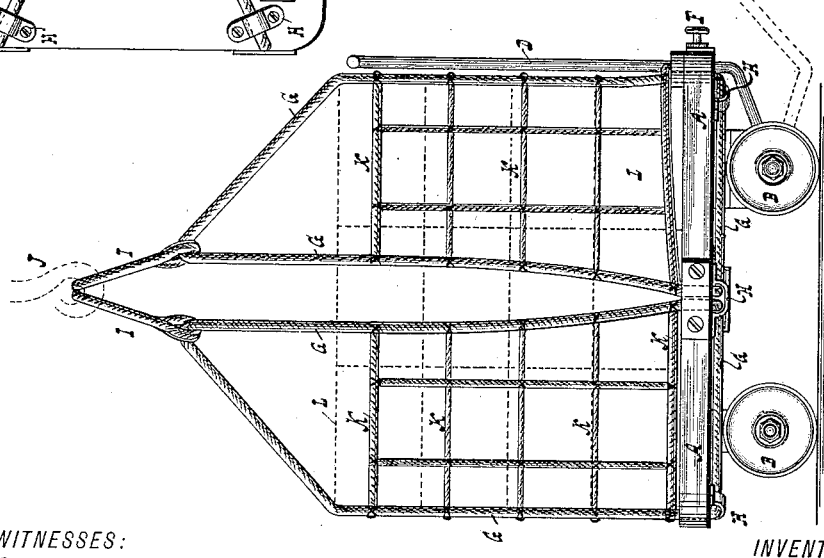
WITNESSES:
A. Faber du Faur
William Miller
INVENTOR,
Frederick Hohorst.
BY Van Santvoord & Hauff
his ATTORNEYS.

United States Patent Office.

FREDERICK HOHORST, OF BROOKLYN, NEW YORK.

SLING AND TRUCK COMBINED.

SPECIFICATION forming part of Letters Patent No. 379,870, dated March 20, 1888.

Application filed November 10, 1887. Serial No. 254,828. (No model.)

*To all whom it may concern:*

Be it known that I, FREDERICK HOHORST, a citizen of the United States, residing at Brooklyn, in the county of Kings and State of New York, have invented new and useful Improvements in Sling and Truck Combined, of which the following is a specification.

The object of this invention is to supply a device which is serviceable both as a sling or lifting device and also as a truck or conveying device, as set forth in the following specification and claims, and illustrated in the accompanying drawings, in which—

Figure 1 is a side elevation of a truck and sling. Fig. 2 is an inverted plan view of Fig. 1. Fig. 3 is a front view of Fig. 1.

Similar letters indicate corresponding parts.

In the drawings, the letter A indicates a truck body or platform adapted to travel on wheels B. One pair of the wheels B is adapted to be turned or swiveled about the bolt C, Fig. 2, by the handle D. By locking the handle D against the body A the handle D will be held off the ground and no turning of the wheels about the bolt C can occur. A lock or latch, E, adapted to be operated by a handle, F, is shown in Figs. 2 and 3 as holding the handle D against the body A. In Fig. 1 the handle D is shown unlocked. The swiveling of the wheels B about the pin C enables the truck to be steered or guided.

The body A is provided with sling-connections, such as strands or ropes G. A loop or loops, I, secured to the ropes G, enable the ropes G to be secured to a hook, J, of a lifting mechanism, such as a steam-winch. The ropes G are shown as passing along beneath the platform A, and being held in place by fastenings H. The ropes G thus form a firm support for the platform A when the truck is suspended from the ropes G.

To the ropes G is secured a retaining device consisting of cords or netting K. When the truck is suspended from the cords G, the retaining netting or fabric K grasps or incloses articles, such as trunks L, which rest on the truck-platform A, so that such articles are prevented from falling or moving out of place in case the truck should swing or jar while being suspended from the cords G.

When the truck is to be loaded or unloaded, the suspending cordage G and retaining cordage K, being flexible, are readily bent or dropped down so as to allow articles to be loaded onto or unloaded from the platform A, and when said platform is loaded said cordage is readily drawn up to the position shown in Fig. 1, so as to allow of the hook J being attached to lift the device. The cords G are shown as firmly secured to the truck, so that said cords will not become detached or lost.

What I claim as new, and desire to secure by Letters Patent, is—

1. A truck having suspending-cords G, passed beneath the truck-body and held in place by fastenings H, substantially as shown and described.

2. A truck having suspending-cords G, passed beneath the truck-body through fastenings H, secured thereto, whereby said suspending-cords are held in place, and having a netting, K, secured to and extending between the suspending-cords to retain goods on the truck, substantially as shown and described.

3. A truck having suspending-cords G, passed beneath the truck-body, fastenings H to hold said cords in place, a netting, K, secured to the suspending-cords above the truck, and loops I, for connecting the suspending-cords to a lifting mechanism, substantially as shown and described.

In testimony whereof I have hereunto set my hand and seal in the presence of two subscribing witnesses.

FREDERICK HOHORST. [L. S.]

Witnesses:
  Mrs. F. HOHORST,
  W. C. HAUFF.